United States Patent Office 2,932,672
Patented Apr. 12, 1960

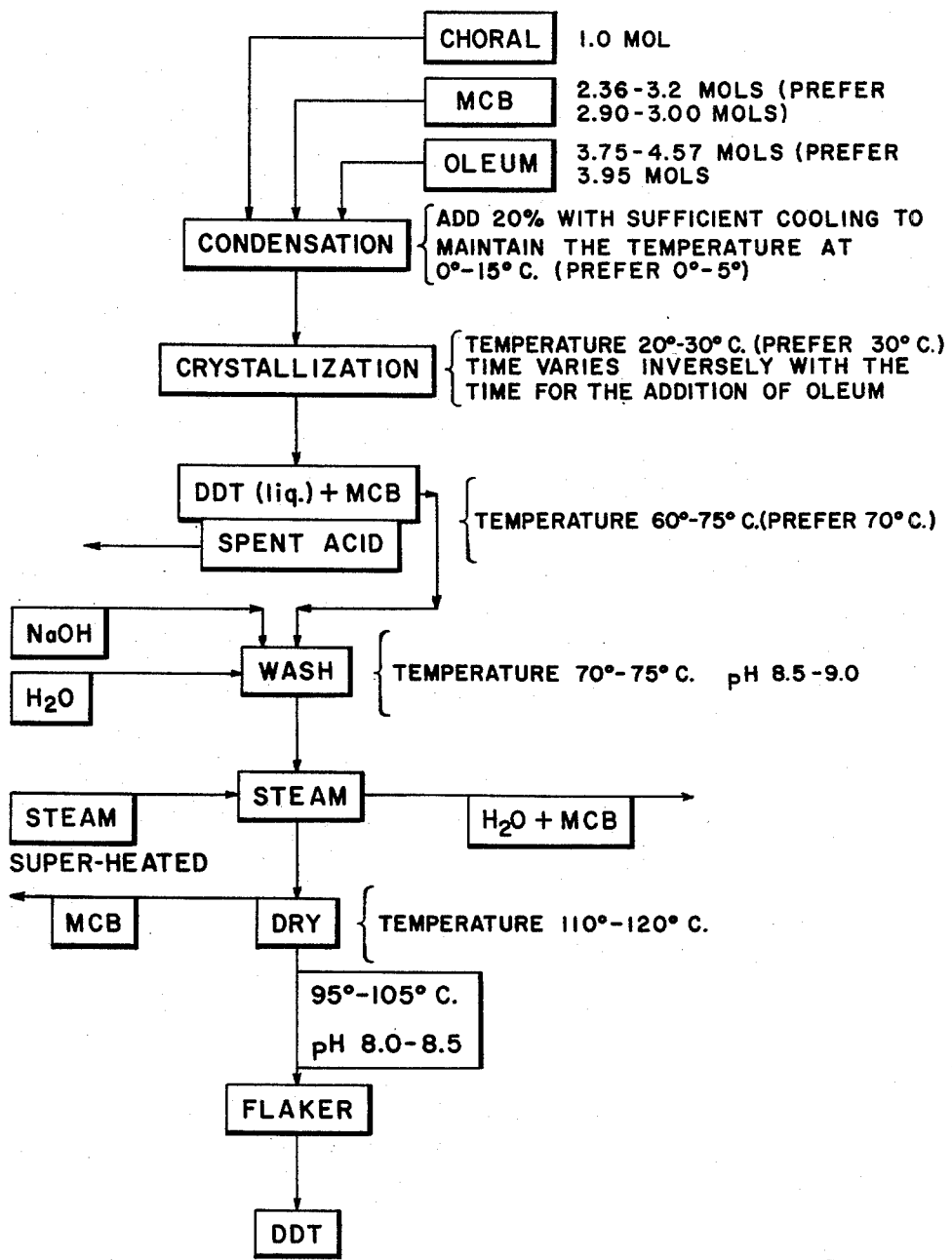

2,932,672
CHEMICAL PROCESS FOR PREPARING TRI-
CHLORO-BIS(CHLOROPHENYL) ETHANE

George A. Miller and Ralph H. Lasco, Painesville, Ohio, assignors to Diamond Alkali Company, Cleveland, Ohio, a corporation of Delaware Application March 12, 1958, Serial No. 721,001
15 Claims. (Cl. 260—649)

This invention relates to improvements in the manufacture of insecticides and more particularly relates to improvements in the manufacture of 1,1,1-trichloro-2,2-bis(p-chlorophenyl) ethane.

It is well known that 1,1,1-trichloro-2,2-bis(p-chlorophenyl) ethane (an insecticidal material commonly known as DDT) may be prepared by condensing chloral with monochlorobenzene in the present of a concentrated sulfuric acid, e.g., 20% oleum. However, the process is a long and costly procedure involving many operations. The chloral, which is produced by the chlorination of ethanol or acetaldehyde, is first purified and then condensed with monochlorobenzene in the presence of 20% oleum. The condensation is effected by adding the oleum, with constant agitation, to a mixture of the chloral and the mononchlorobenzene.

In the past, it has generally required seven hours or more to complete the addition of the oleum, following which addition, the mixture is agitated for an additional seven hours, to complete the condensation and bring about the crystallization of the crude DDT. During this agitation period, an additional quantity of the monochlorobenzene is generally added to the mixture as a thinner. Following the agitation, the crude DDT is separated from the oleum, water washed, dried and flaked. The flaked product is sold as such or may be pulverized to produce a fine powder.

Inasmuch as the time required for the condensation and crystallization is upwards to 14 hours or more, with the amount of DDT produced being from 80–85% based on the amount of chloral used, it is obvious that in the prior art processes only 2 batches of DDT a day can be produced in each unit of equipment. Since the productivity of each unit is thereby limited, large capital outlays are necessary to acquire a sufficient number of production units so that a profitable quantity of DDT can be produced.

It is therefore an object of this invention to provide a method for producing DDT wherein the time for the condensation and crystallization of the crude DDT product is greatly reduced.

Another object of this invention is to provide a method of the above type wherein the quality of the DDT which is produced is at least equal to that produced by the presently used methods.

A further object of this invention is to provide a method of the above type wherein the percent efficiency of the DDT produced, based on the amount of chloral used, is at least equal to that of the presently used processes.

These and other objects of the invention will become apparent to those skilled in the art from the description of the invention which follows.

The single drawing which is attached hereto and which is made a part hereof, is a flow sheet showing a typical process for the production of DDT, having incorporated therein the improvements of the present invention.

In the past, it had been felt that little, if any, excess monochlorobenzene should be used in the reaction charge and hence the charge contained about 1 mole of chloral and 2 mols of monochlorobenzene. However, it has been found in the practice of the present invention, that by using an excess of monochlorobenzene, e.g., 2.36 to 3.2 moles, in the reaction charge to 1 mole of chloral, and maintaining the temperature of the reaction mixture between 0–15° C. during the addition of the time required for the condensation of the chloral and the monochlorobenzene and for the crystallization of the crude DDT can be reduced by at least 50%.

The method of the present invention envisions charging 1 mole of chloral and 2.36 to 3.2 moles of monochlorobenzene with 2.9 to 3 moles being the preferred amount, in a reactor, and adding thereto 3.75 to 4.57 moles of 20% oleum, 3.95 moles being preferred, to effect the condensation of the chloral and the monochlorobenzene. During the time of the addition of the 20% oleum, the temperature of the mixture is maintained between 0° and 15° C., with 0° to 5° being the preferred range. Following the addition of the oleum, the temperature of the mixture is permitted to rise to between 20° and 30° C., 30° being preferred, while the agitation is continued until crystallization of the crude DDT is substantially complete. It has been found that the length of time required for the crystallization of the DDT within the temperature range of 20° to 30° C., is inversely proportional to the time for the addition of the 20% oleum. That is, the longer the period of time for the addition of the 20% oleum, the shorter is the time required to effect the crystallization of the crude DDT, and vice versa.

In the practice of the present invention, it has been found that the 20% oleum may be added over a period of from 1–5 hours, 4 hours being preferred, the temperature being maintained within the preferred range of 0–5° C. It has further been found that when adding the 20% oleum over the above period of time, the crystallization of the crude DDT is substantially complete after further agitation for not more than 6 hours, and generally within 4 hours.

Referring now to the flow sheet drawing, 1 mole of chloral and 2.36 to 3.20 moles of monochlorobenzene, preferably about 2.90 to 3.0 moles, are mixed in a condensator or similar reactor. To this mixture is added 3.75 to 4.57 moles of 20% oleum, preferably about 3.95 moles, over a period of 1–5 hours, with constant agitation, while the temperature of the reaction mixture is maintained between 0–15° C., preferably 0–5° C. Following the addition of the 20% oleum, the mixture is agitated for a period of up to 6 hours, depending on the length of time taken for the addition of the oleum, at a temperature between 20°–30° C., preferably about 30° C. At the end of this time, the crystallization of the crude DDT is substantially complete and the mixture is heated to between 60°–75° C., preferably about 70° C., thereby melting the DDT and dissolving it in the excess monochlorobenzene. At this temperature, the reaction mixture forms into two layers, the upper layer containing the monochlorobenzene with dissolved DDT, and the lower layer containing the spent oleum and chlorobenzene sulfonic acid, which is one of the by-products of the condensation reaction. This lower layer is drawn off and if desired may be subjected to steam distillation, thereby recovering low grade sulfuric acid and monochlorobenzene, which latter material may be recycled to the condensator in making up a new reaction charge.

The monochlorobenzene-DDT layer is then water washed at temperatures between 70°–75° C. and the pH thereof is adjusted with sodium hydroxide to about 8.5–9. The DDT is then steam dried at a temperature between 110–120° C. to drive off all of the monochlorobenzene. The pH of the DDT, following the drying step, is between 8–8.5. Following the drying step the DDT is put in a flaker, from which is obtained the final product DDT.

As is well known in the art, the quality of DDT is designated by its set point, which term is defined as the highest temperature which is reached when molten DDT solidifies and is an indication of the relative amount of the di-p-chlorophenyl (trichloroethane) isomer, which is the active isomer, with respect to the o-chlorophenyl-p-chlorophenyl-trichloroethane isomer, present in the DDT. A temperature of 89° C. has been established as the minimum set point which DDT may have under U.S. Government Standards.

In the past, the condensation and crystallization has been carried out at temperatures not in excess of about 20° C., since it is known that the use of higher temperatures results in the formation of greater amounts of the o-p'-isomer, thereby giving a product having a set point below standard. However, in the practice of the present invention, it has been found that the p,p'-o,p' ratio is largely determined during the time of the oleum addition, which addition in the present process is carried out at temperatures from 0–15° C. and preferably 0–5° C. Therefore, after the oleum has been added, the temperature during the crystallization period may be maintained at 20–30° C. and preferably at 30° C., thereby providing a more rapid crystallization of the crude DDT and thus making it possible to reduce the time required for this crystallization.

The addition of an excess of monochlorobenzene into the reaction charge is believed to serve a three-fold purpose. First, the excess monochlorobenzene serves to dissipate the heat which is formed when the 20% oleum is added to the reaction mixture, thus making it possible to add the oleum in a shorter period of time than was previously possible. Secondly, the excess monochlorobenzene serves as a thinner for the reaction mixture, thereby making agitation of the mixture considerably easier. Thirdly, the excess monochlorobenzene serves as a solvent for the crude DDT when the reaction mixture is heated to 60–75° C. prior to separating the DDT from the spent oleum and sulfonated products. In this latter instance, the excess monochlorobenzene removes the need for the addition of some other solvent for the crude DDT, which solvent would then have to be removed from the DDT by an additional purification step.

Although this excess monochlorobenzene may be added to the reaction mixture at any time during the crystallization step, it has been found that where it is desired to carry out the reaction with a minimum of external cooling and in the shortest period of time, superior results are obtained when all of the monochlorobenzene is included in the reaction charge.

In order that those skilled in the art may better understand the method of the present invention and the manner in which it may be practiced, the following specific examples are offered.

*Example I*

147.4 g. (1 mole) of chloral and 265.5 g. (2.36 moles) of monochlorobenzene are placed in a 1-liter, 3-necked flask equipped with a stirrer, thermometer, drying tube and addition funnel. The flask is immersed in an ice bath and 371 g. (3.95 moles) of 20% oleum are added over a period of one hour while maintaining the temperature in the flask between 10–15° C. Following the addition of the oleum, the temperature of the mixture is allowed to rise to 19–21° C. and is maintained at this level for 5 hours while the mixture is agitated. At the end of the reaction time, 70 g. (.55 mole) of monochlorobenzene is added and the reaction mixture is heated to 70° C. The mixture is then transferred to a separatory funnel and the acid layer, which is the bottom layer, is separated and the organic layer is washed with 350 ml. portions of water and 150 ml. portions of caustic solution having a pH of 10–11, and finally washed with 2 additional 150 ml. portions of water. The washed organic layer is then steam distilled until about 1½ liters of distillate are obtained and is then poured into a crystallizing dish. After the DDT has solidified in the dish, the water is decanted off and the DDT is dried in an oven at about 120° C. for 4–6 hours. 309.5 g. of DDT are produced representing an 86.3% yield based on the amount of chloral used, and having a set point of 92.

*Example II*

The same procedure was used as in Example I with the exception that 272 g. (2.42 moles) of monochlorobenzene are used in the reaction mixture. 302 g. of DDT are produced representing a yield of 85.2% based on the amount of chloral used, and having a set point of 92.

*Example III*

The same procedure is used as in Example I except that 287 g. (2.55 moles) of monochlorobenzene are used in the reaction mixture. 313.7 g. of DDT are produced, representing an 88.5% yield based on the amount of chloral used, and having a set point of 92.

*Example IV*

The same procedure is used as in Example I except that 326 g. (2.9 moles) of monochlorobenzene are used and no additional monochlorobenzene is added at the end of the reaction time. 302.7 g. of DDT are produced, representing a yield of 85.4% based on the amount of chloral used, and having a set point of 93.

*Example V*

The same procedure is used as in Example IV except that 260 g. (3.2 moles) of monochlorobenzene are used. 301.3 g. of DDT are produced, representing an 85% yield based on the amount of chloral used, and having a set point of 92.

*Example VI*

The same procedure is used as in Example I except that 272 g. (2.42 moles) of monochlorobenzene is added to the reaction mixture and the reaction mixture is maintained at 0–5° C. during the addition of the oleum. 306.6 g. of DDT are produced, representing a yield of 86.5% based on the amount of chloral used, and having a set point of 93.

*Example VII*

The same procedure is used as in Example VI except that the oleum is added over a period of 2 hours while maintaining the reaction mixture between 10–15° C. and the reaction mixture is then agitated after the addition of the oleum for an additional 4 hours at 20° C. 307.4 g. of DDT are produced, representing a yield of 86.7% based on the amount of chloral used, and having a set point of 92.

*Example VIII*

The same procedure is followed as in Example I except that 326 g. (2.91 moles) of monochlorobenzene are added in the reaction mixture and no additional monochlorobenzene is added. The oleum is added over a period of 3½ hours while the reaction mixture is maintained at 0–5° C. and following the addition of the oleum, the mixture is agitated for an additional 3½ hours at 20° C. 309.8 g. of DDT are produced, representing a yield of 87.4% based on the amount of chloral used, and having a set point of 93.

*Example IX*

The same procedure is used as in Example VIII except that the reaction mixture is agitated after the addition of the oleum for ½ hour at 20° C. and for 3 hours at 30° C. 320.8 g. of DDT are produced, representing a yield of 90.5% based on the amount of chloral used and having a set point of 93.

*Example X*

The same procedure is followed as in Example IX except that the temperature of the reaction mixture during the addition of the oleum is maintained at 10–15° C. 312 g. of DDT are produced, representing a yield of 88% based on the amount of chloral used and having a set point of 93.

*Example XI*

In an actual plant run, a 1500 gallon capacity reactor is used, which reactor is constructed of steel and having an external jacket through which refrigerated brine or steam may be passed. The reactor is equipped with an agitator, and has coils disposed within it, through which refrigerated brine or steam may be passed. 275 gallons of chloral and 850 gallons of monochlorobenzene are charged into the reactor. 546 gallons of oleum are added to the reactor over a period of 3½–4 hours, while holding the temperature of the mixture between 0–5° C. by circulating refrigerated brine through the jacket and the coils within the reactor. The mixture is agitated during this entire time. Following the addition of the oleum, the temperature is allowed to rise to 28–30° C. and the agitation is continued for 4 additional hours. At the end of this time, the mixture is heated to 70° C. and allowed to separate into two layers, the spent acid and sulfonation products being in the bottom layer and the DDT dissolved in monochlorobenzene being in the upper layer. The bottom layer is drawn off and the upper layer is washed with water at about 80–85° C. Following the washing, the pH of the DDT is adjusted to 8.5–9.0 with a caustic solution and the DDT is steam dried at 110–120° C. Following the drying, the DDT is transferred to a flaker from which the final product DDT is obtained. 7075 lbs. of DDT are produced, representing a yield of 83.9% based on the amount of chloral used, and having a set point of 93.

It has been found that by the use of the present process, the percentage yield obtained as based on the amount of chloral used is at least comparable to that obtained in the prior art processes, i.e., 83.9% as compared to 80–85%, and in some runs is even higher, i.e., 90%. Moreover, by the present process the DDT produced is of a higher quality, having a set point of 92–93° C. as compared to one of 89–90° C. for DDT produced by the methods of the prior art. It has further been found that by the method of this invention, the time required for the condensation and crystallization of a batch of DDT is cut in half, being reduced from 14–16 hours to 7–8 hours or less. Inasmuch as the present process is readily adaptable to existing equipment, it is thus seen by the use of this process, it is possible to increase the productivity of the equipment ⅓ to ½ without any material changes or additions thereto.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. In the method of preparing 1,1,1-trichloro-2,2-bis-(p-chlorophenyl)ethane by the condensation of chloral and monochlorobenzene in the presence of 20% oleum, wherein the oleum is added to a mixture of chloral and monochlorobenzene, the mixture being agitated during the addition of the oleum and for a period of time thereafter sufficient to complete the crystallization of crude 1,1,1 - trichloro - 2,2 - bis(p - chlorphenyl)ethane, the improvements comprising carrying out the reaction using a reaction mixture of which the ratio of the components of said reaction mixture are 1 mol of chloral to 2.36–3.20 mols of monochlorobenzene to 3.75–4.57 mols of oleum, maintaining the temperature of the reaction mixture between 0–15° C. during the addition of the 20% oleum, allowing the temperature of the reaction mixture to rise to 20–30° C. after the addition of the oleum and agitating the mixture at this temperature for a time inversely proportional to that required for the addition of the oleum, the total time required for the oleum addition and agitation not exceeding 11 hours, to crystallize substantially all of the crude 1,1,1-trichloro-2,2-bis(p-chlorophenyl)ethane out of the reaction mixture.

2. A method as claimed in claim 1 wherein the temperature of the reaction mixture during the addition of the 20% oleum is maintained between 0–5° C. and the temperature of the reaction mixture following the addition of the 20% oleum is maintained at 30° C.

3. The method as claimed in claim 1 wherein the temperature of the reaction mixture during the addition of the 20% oleum is maintained between 10–15° C. and the temperature of the reaction mixture following the addition of the 20% oleum is maintained at 20° C.

4. The method as claimed in claim 2 wherein the ratio of the components of the reaction mixture are 1 mole of chloral to 2.9–3.0 moles of monochlorobenzene to 3.95 moles of oleum.

5. The method as claimed in claim 3 wherein the ratio of the components of the reaction mixture are 1 mole of chloral to 2.9–3.0 moles of monochlorobenzene to 3.95 moles of oleum.

6. The method as claimed in claim 4 wherein the 20% oleum is added over a period of 2–5 hours and the mixture is agitated following the addition of the oleum for a period of time not in excess of 6 hours.

7. The method as claimed in claim 5 wherein the 20% oleum is added over a period of time of from 2–5 hours and the mixture is agitated following the addition of the oleum for a period of time not in excess of 6 hours.

8. The method as claimed in claim 6 wherein the 20% oleum is added over a period of four hours and the mixture is agitated following the addition of the oleum for a period of 4 hours.

9. The method as claimed in claim 6 wherein the 20% oleum is added over a period of 3½ hours and the reaction mixture is agitated following the addition of the oleum for a period of 3½ hours.

10. The method as claimed in claim 7 wherein the 20% oleum is added over a period of 4 hours and the reaction mixture is agitated following the addition of the oleum for a period of 4 hours.

11. The method as claimed in claim 7 wherein the 20% oleum is added over a period of 3½ hours and the reaction mixture is agitated following the addition of the oleum for a period of 3½ hours.

12. The method as claimed in claim 2 wherein the 20% oleum is added over a period of from 2–5 hours and the reaction mixture is agitated following the addition of the oleum for a period not in excess of 6 hours.

13. The method as claimed in claim 3 wherein the 20% oleum is added over a period of 2–5 hours and the reaction mixture is agitated following the addition of the oleum for a period of time not in excess of 6 hours.

14. The method as claimed in claim 2 wherein the ratio of the components of the reaction mixture are 1 mole of chloral to 2.42–2.55 moles of monochlorobenzene to 3.95 moles of oleum.

15. The method as claimed in claim 3 wherein the ratio of the components of the reaction mixture are 1 mole of chloral to 2.42–2.55 moles of monochlorobenzene to 3.95 moles of oleum.

References Cited in the file of this patent

UNITED STATES PATENTS 2,519,423    Anthony et al. _____ Aug. 22, 1950